(12) United States Patent  
Yamada (10) Patent No.: US 6,573,935 B1  
(45) Date of Patent: Jun. 3, 2003

(54) TWO-DIMENSIONAL SOLID STATE IMAGE PICKUP DEVICE (75) Inventor: Tetsuo Yamada, Miyagi (JP)

(73) Assignees: Fuji Photo Film Co., Ltd., Kanagawa (JP); Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/311,292

(22) Filed: May 14, 1999

(30) Foreign Application Priority Data

May 18, 1998 (JP) .......................................... 10-135415

(51) Int. Cl.[7] .............................................. H04N 5/335
(52) U.S. Cl. ......................... 348/272; 348/280; 348/297
(58) Field of Search ................................. 348/266, 272, 348/273, 274, 275, 280, 281, 282, 294, 295, 296, 297, 298, 299, 241, 248, 250; 250/208.1; H04N 5/775

(56) References Cited

U.S. PATENT DOCUMENTS 5,512,945 A * 4/1996 Sakurai et al. ........... 348/221.1
5,703,641 A * 12/1997 Watanabe .................... 348/274
6,018,363 A * 1/2000 Horii ........................ 348/219.1

FOREIGN PATENT DOCUMENTS

JP 5-236354 9/1993 .......... H04N/5/335

* cited by examiner

Primary Examiner—Tuan Ho
(74) Attorney, Agent, or Firm—Sughrue Mion, PLLC

(57) ABSTRACT

A solid state image pickup device has: a plurality of photoelectric conversion elements for generating and accumulating electric charges corresponding to an amount of incidence light; color filters of a plurality of colors disposed on the plurality of photoelectric conversion elements; a control signal generating unit for independently setting for each color a charge storage time of the plurality of photoelectric conversion elements formed with color filters and generating for each color a read control signal of the plurality of photoelectric conversion elements; a reading member for reading electric charges from the plurality of photoelectric conversion elements for each color in response to each read control signal; a transfer member for transferring electric charges read by the reading member; and an output member for outputting electric charges transferred by the transfer member to an output circuit.

19 Claims, 9 Drawing Sheets

TWO-DIMENSIONAL SOLID STATE IMAGE PICKUP DEVICE

This application is based on Japanese patent application No. 10-135415 filed on May 18, 1998, the whole contents of which are incorporated herein by reference.

BACKGROUND OF THE INVENTION a) Field of the Invention

The present invention relates to a solid state image pickup device, and more particularly to a solid state image pickup device for taking a two-dimensional image.

b) Description of the Related Art

A charge transfer type solid state image pickup device or so-called CCD solid state image pickup device has a plurality of photoelectric conversion elements disposed on a two-dimensional plane at predetermined pitches, reads charges generated by and accumulated in the photoelectric conversion elements, and outputs image signals corresponding to the charges. A color image sensor has a plurality of photoelectric conversion elements and color filters of three primary colors, red (R), green (G) and blue (B) formed on light reception surfaces of the photoelectric conversion elements.

Figure 8:
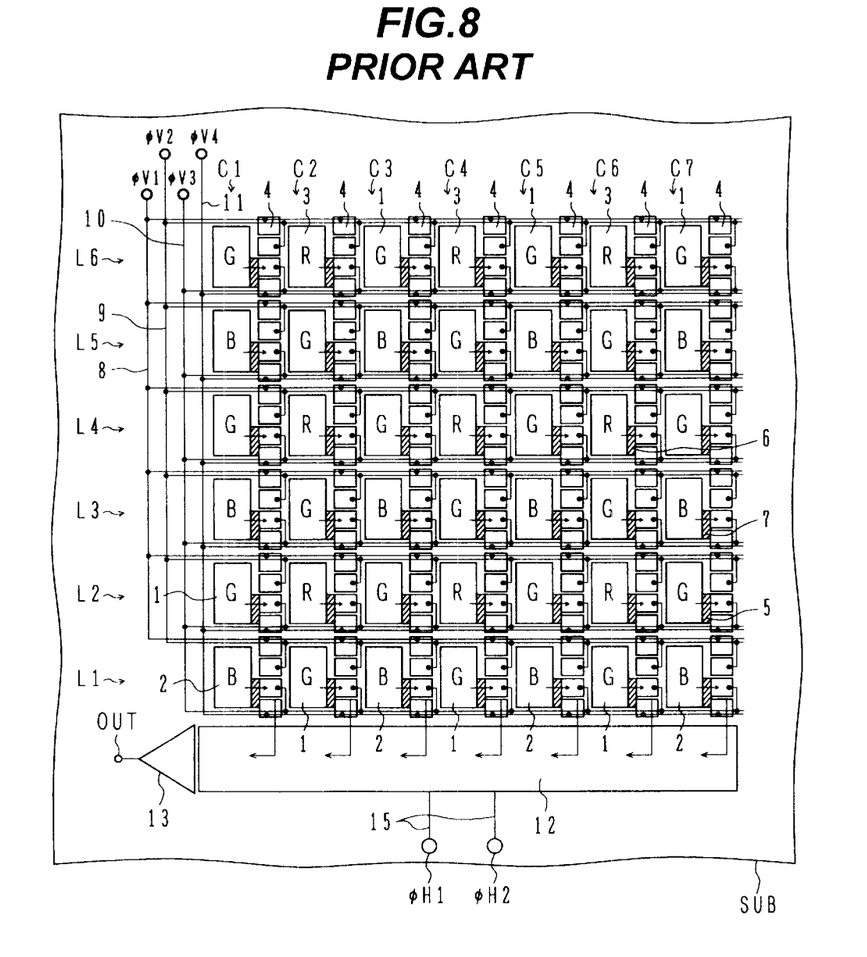
FIG. 8 is an enlarged plan view showing a portion of a conventional solid state image pickup device.

FIG. 8 is an enlarged plan view showing a portion of a two-dimensional color solid state image pickup device according to prior art. Referring to FIG. 8, reference numerals 1, 2 and 3 represent photoelectric conversion elements (hereinafter, also called a light reception element). The photoelectric conversion element 1 labeled as G is a green photoelectric conversion element (hereinafter called a G element) formed with a green filter. The photoelectric conversion element 2 labeled as B is a blue photoelectric conversion element (hereinafter called a B element) formed with a blue filter. The photoelectric conversion element 3 labeled as R is a red photoelectric conversion element (hereinafter called an R element) formed with a red filter. The photoelectric conversion elements 1, 2 and 3 are disposed in a two-dimensional matrix shape at positions corresponding to pixels. The two-dimensional matrix is constituted of six rows L1 to L6 and seven columns C1 to C7.

Vertical transfer elements 4 are disposed between two adjacent light reception elements along the vertical direction and transfer signal charges obtained at each light reception element upward along the column direction. The vertical transfer element 4 is provided with four transfer electrodes per one light reception element, the four transfer electrodes constituting one transfer stage. Vertical transfer elements of one column is constituted of transfer stages of one column. Four-phase transfer pulses $\phi V1$, $\phi V2$, $\phi V3$ and $\phi V4$ are applied via signal lines 8, 9, 10 and 11 to the four transfer electrodes of each light reception element.

A G signal read gate 5 shown hatched reads signal charges from each G element 1 and transfers the charges to the vertical transfer element 4. An R signal read gate 6 shown hatched reads signal charges from each R element 3 and transfers the charges to the vertical transfer element 4. A B signal read gate 7 shown hatched reads signal charges from each B element 2 and transfers the charges to the vertical transfer element 4. The transfer pulse $\phi V3$ is applied via the signal line 10 to the G. R and B read gates 5, 6 and 7 to control read timings.

A horizontal transfer unit 12 transfers, in the horizontal direction, signal charges transferred in parallel from the vertical transfer elements 4 at the columns in the unit of one line (row). The horizontal transfer unit 12 transfers signal charges in response to two-phase transfer pulses $\phi H1$ and $\phi H2$. Arrows shown in FIG. 8 indicate the transfer direction of signal charges.

The signal charges transferred by the horizontal transfer unit 12 are converted into a voltage signal by an output circuit 13 to be supplied to an external circuit as a signal OUT. The G, B, R light reception elements 1, 2 and 3, vertical transfer elements 4, read gates 5, 6 and 7, horizontal transfer unit 12 and output circuit 13 are all formed on a single semiconductor substrate SUB.

Figure 9:
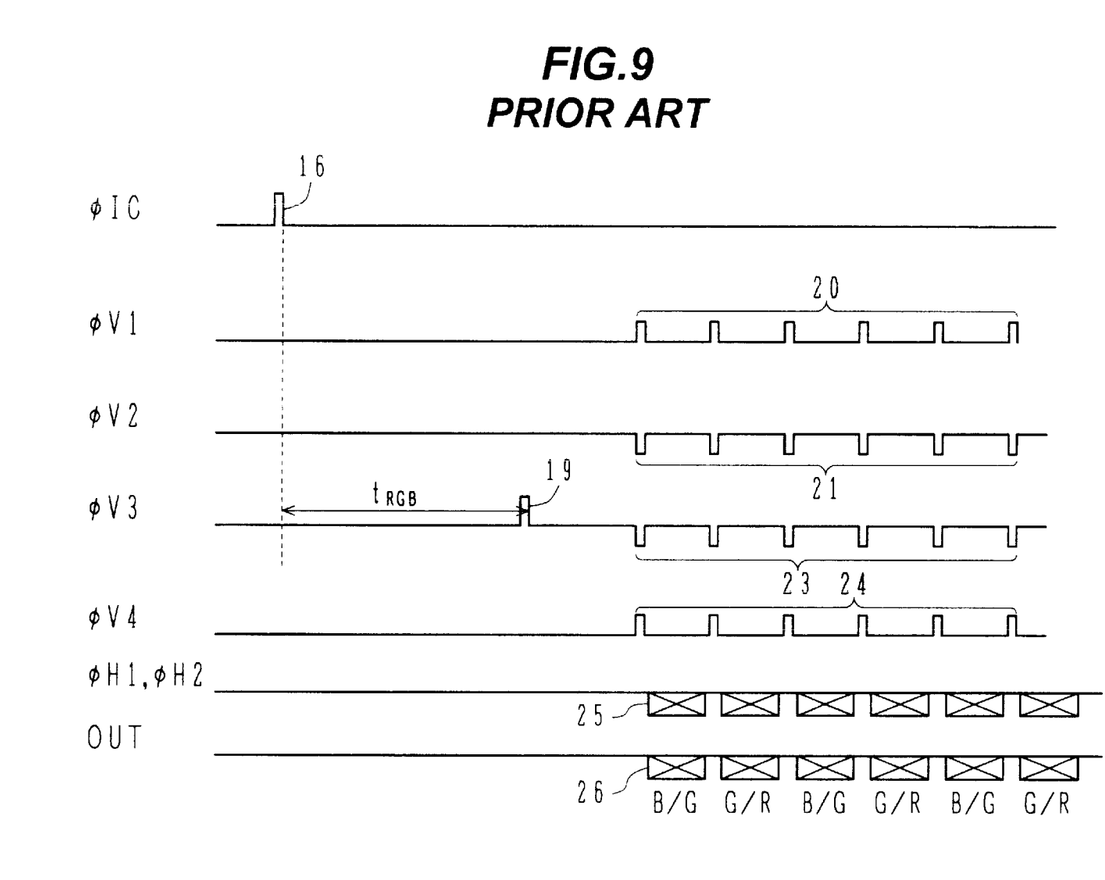
FIG. 9 is a timing chart illustrating the operation of the solid state image pickup device shown in FIG. 8.

FIG. 9 is a timing chart illustrating the operation of the two-dimensional solid state image pickup device shown in FIG. 8. A pulse 16 in a signal $\phi IC$ is an integration clear pulse which is used for instantly draining (resetting) all charges in the R, G and B to a drain. This drain is the semiconductor substrate SUB. The solid state image pickup device has, therefore, an overflow drain structure which is shown in FIG. 2 of Japanese Patent Publication No. 5-236354.

Referring to FIGS. 8 and 9, a pulse 19 in a signal $\phi V3$ is used for opening the read gates 5, 6 and 7 and reading signal charges in the light reception elements 1, 2 and 3 to the vertical transfer elements 4. The signal charge storage time (integration time) $t_{RGB}$ of each of the light reception elements 1, 2 and 3 is determined by a period from the fall timing of the clear pulse 16 to the fall timing of the read pulse 19.

Four-phase vertical transfer pulses 20, 21, 24 and 24 are supplied as signals $\phi V1$, $\phi V2$, $\phi V3$ and $\phi V4$. Signal charges are transferred by one transfer stage of each vertical transfer element in response to one vertical transfer pulse. By repeating this operation, signal charges of one horizontal line (one row) are transferred in parallel to the horizontal transfer unit 12.

The two-phase horizontal transfer pulse signals $\phi H1$ and $\phi H2$ control the transfer operation of the horizontal transfer unit 12. Signal charges of one horizontal line are transferred in the horizontal transfer unit 12 during each period of the signals $\phi H1$ and $\phi H2$ indicated by a rectangle with diagonal lines.

In the output signal OUT, a signal 26 indicated by a rectangle with diagonal lines is an output pixel signal output from the output circuit 13. Each rectangular block corresponds to a pixel signal train of one horizontal line. Pixel signals of the first row L1 are output in the order of B, G, B, G, . . . , and pixel signals in the second row L2 are output in the order of G, R, G, R . . .

Since the signal storage time $t_{RGB}$ is determined by the period from the fall timing of the clear pulse 16 to the fall timing of the read pulse 19, the color signal component ratio cannot be changed. Namely, the same sensitivity is used for each of three colors.

For example, if a white balance is set by using illumination light at 3200° K (such as an incandescent lamp) or at 5100° K (such as a fluorescent lamp) as reference light, a proper signal component ratio of R to G at 3200° K is different from that at 5100° K.

The signal component ratio of R to G cannot be changed as described above so that a proper ratio for given illumination conditions cannot be obtained. Namely, the color signal component ratio is determined only by the spectral characteristics of color filters formed on photoelectric conversion elements, and a color signal ratio suitable for a color temperature of illumination light cannot be obtained.

SUMMARY OF THE INVENTION

It is an object of the present invention to provide a solid state image pickup device capable of independently and variably controlling the sensitivities of different color light reception elements (e.g., R, G and B elements), i.e., the signal storage times, so as to obtain a color signal component ratio suitable for a color temperature of illumination light which illuminates a subject.

It is another object of the invention to provide a solid state image pickup device capable of reducing an output level difference to be caused by a difference in the amounts of crosstalk from some light reception elements to other light reception elements.

According to one aspect of the present invention, there is provided a solid state image pickup device comprising: a plurality of photoelectric conversion elements formed on a two-dimensional plane for generating and accumulating electric charges corresponding to an amount of incidence light; color filters of a plurality of colors disposed on the plurality of photoelectric conversion elements; control signal generating means for independently setting for each color a charge storage time of the plurality of photoelectric conversion elements formed with color filters and generating for each color a read control signal of the plurality of photoelectric conversion elements after a lapse of each charge storage time; reading means for reading electric charges from the plurality of photoelectric conversion elements for each color in response to each read control signal for each color; transfer means for transferring electric charges read by the reading means; and output means for outputting electric charges transferred by the transfer means to an output circuit.

It is possible to adjust the sensitivities of photoelectric conversion elements of respective colors, e.g., R, G and B by controlling a relation between charge storage times (integration times) of R, G and B elements. It is therefore possible to set an optimum color signal component ratio in accordance with a color temperature of a subject.

According to another aspect of the present invention, there is provided a solid state image pickup device comprising: a plurality of photoelectric conversion elements formed on a two-dimensional plane for generating and accumulating electric charges corresponding to an amount of incidence light; color filters of a plurality of colors disposed on the plurality of photoelectric conversion elements; control signal generating means for independently setting, for each of a plurality of different groups of color filters of one color divided in correspondence with a different color of adjacent color filters in a column direction, a charge storage time of the photoelectric conversion elements of each different group, and generating a read control signal of the photoelectric conversion elements of each different group after a lapse of each charge storage time; reading means for reading electric charges from the photoelectric conversion elements of each group in response to each read control signal for each group; transfer means for transferring electric charges read by the reading means; and output means for outputting electric charges transferred by the transfer means to an output circuit.

Fixed pattern noises to be cause by a difference amount of crosstalk to be caused by different color filter layouts can be reduced by adjusting the charge storage times of different groups of photoelectric conversion elements of a certain color.

DETAILED DESCRIPTION OF THE PREFERRED EMBODIMENTS

1st Embodiment

Figure 1:
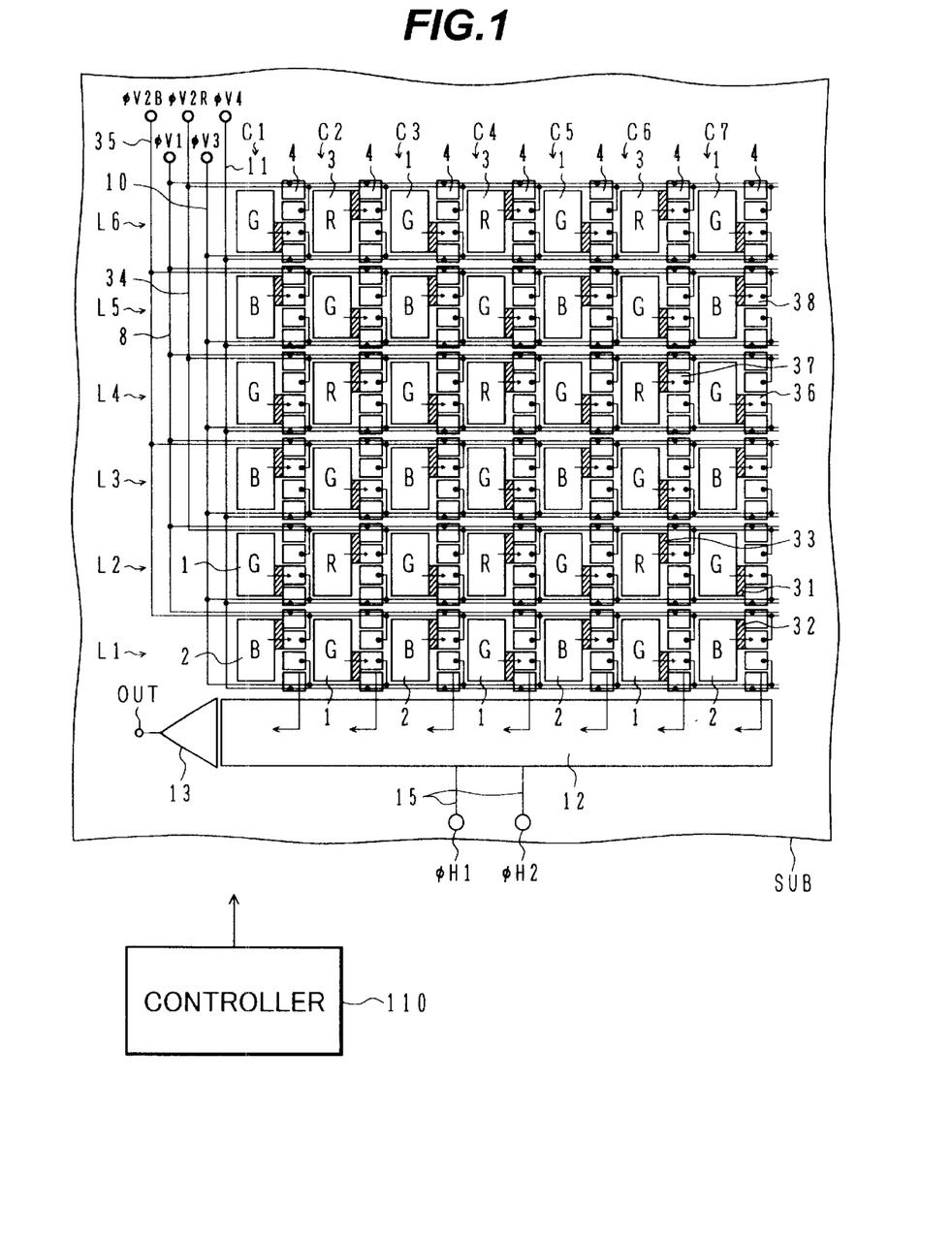
FIG. 1 is an enlarged plan view showing a portion of a solid state image pickup device according to a first embodiment of the invention.
Figure 2:
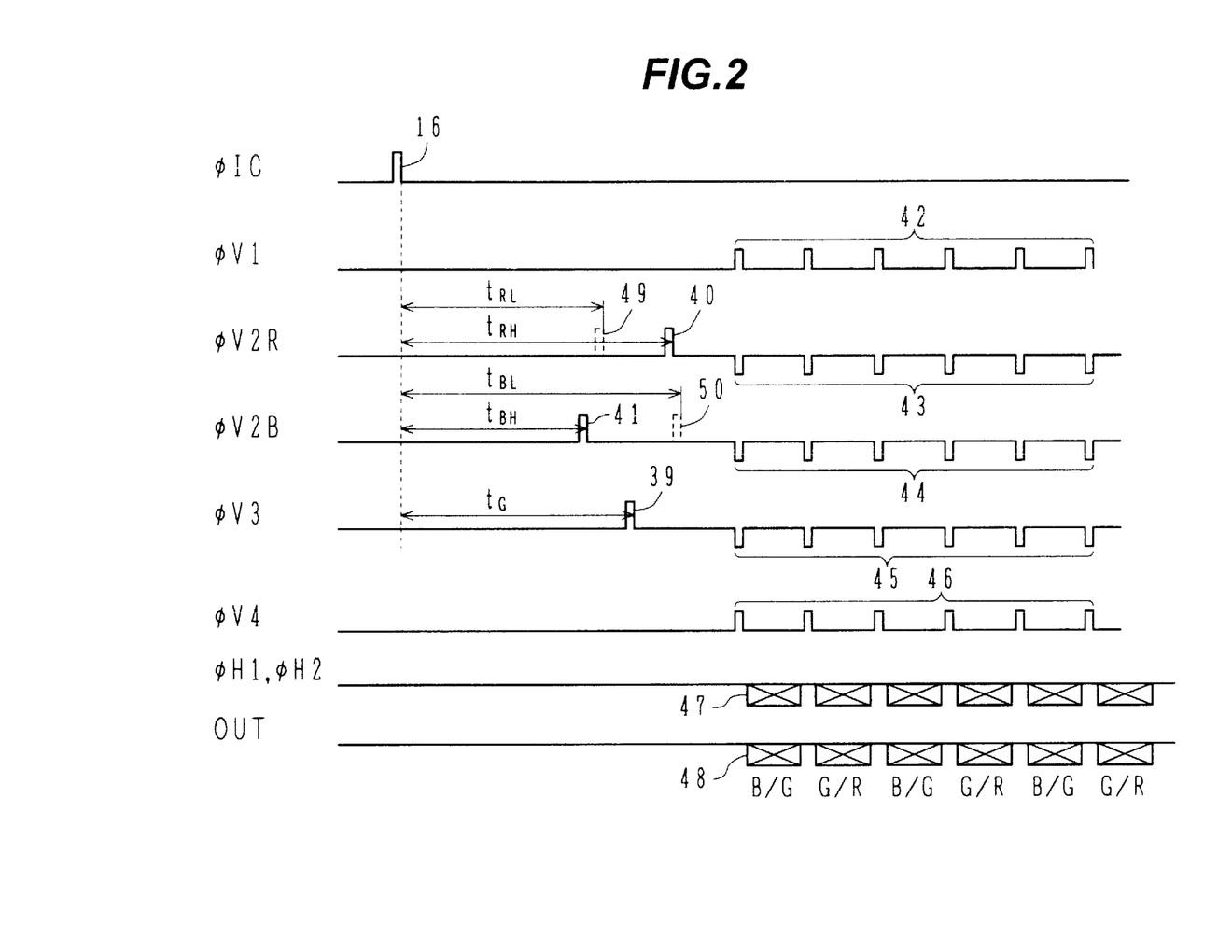
FIG. 2 is a timing chart illustrating the operation of the solid state image pickup device shown in FIG. 1.

FIG. 1 is an enlarged plan view showing a portion of a solid state image pickup device according to the first embodiment of the invention, and FIG. 2 is a timing chart illustrating the operation of the solid state image pickup device. In FIGS. 1 and 2, elements having identical reference numerals to those shown in FIGS. 8 and 9 have fundamentally the same functions as those described with FIGS. 8 and 9.

The solid state image pickup device shown in FIG. 1 has the same layout (so-called Bayer layout) as that of the color filter shown in FIG. 8. This solid state image pickup device has an overflow drain structure which uses a semiconductor substrate SUB as a drain. For the general background of the overflow drain structure, for example, refer to JP-A-5-236354 which is herein incorporated by reference. At the first row (first line) L1, elements are disposed from the left to right in the order of B, G, B, G, B, G, ..., and the second row (second line) L2, elements are disposed from the left to right in the order of G, R, G, R, G, R, ... At the third and following rows, elements are disposed by repeating the same layout as the first and second rows.

Different structures from the structure shown in FIG. 8 will be described. Four-phase pulses φV1, φV2B, φV2R and φV4 are applied via signal lines 8, 34, 35, 10 and 11 to four transfer electrodes corresponding to each light reception element.

A G signal read gate (electrode) 31 shown hatched is used for reading a signal charge from each G element and transferring it to its vertical transfer element 4. A B signal read gate 32 shown hatched is used for reading a signal charge from each B element and transferring it to its vertical transfer element 4. A R signal read gate 33 shown hatched is used for reading a signal charge from each R element and transferring it to its vertical transfer element 4.

The G signal read gate 31 is formed in a lower area of the G element 1. The B and R signal read gates 32 and 33 are formed in middle areas of the B and R elements 2 and 3. Since the position of the read gate is changed with color, the wiring pattern connected to each read gate can be simplified.

Characteristic points of this embodiment are that the read gates 31, 32 and 33 of respective colors are independently controlled by different control signals φV3, φV2B and φV2R, i.e., the read gate 31 of the G element 1 is controlled by the signal φV3, the read gate 32 of the B element 2 is controlled by the signal φV2B, and the read gate 33 of the R element 3 is controlled by the signal φV2R. This is considerably different from the conventional techniques described with FIG. 8 in which the signal φV3 controls all the read gates 5, 6 and 7 for reading light reception elements of all colors.

A controller 110 generates signals φIC, φV1, φV2R, φV2B, φV3, φV4, φH1 and φH2 shown in FIG. 2. As seen from the timing chart of FIG. 2, the read gate 31 of the G element 1 is controlled by a positive potential pulse 39 supplied as the signal φV3, the read gate 32 of the B element 2 is controlled by a positive potential pulse 41 supplied as the signal φV2B, and the read gate 33 of the R element 3 is controlled by a positive potential pulse 40 supplied as the signal φV2R. Therefore, the signal charge read timings of G, B and R elements can be controlled independently.

More specifically, the signal storage time (integration time) of the R element 3 is determined by a period $t_{RH}$ from the fall timing of the clear pulse 16 to the fall timing of the read pulse 40. The signal storage time (integration time) of the B element 2 is determined by a period $t_{BH}$ from the fall timing of the clear pulse 16 to the fall timing of the read pulse 41. The signal storage time (integration time) of the G element 1 is determined by a period $t_G$ from the fall timing of the clear pulse 16 to the fall timing of the read pulse 39.

With the read control pulses 40, 41 and 39, the integration time is $t_{RH} > t_{BH}$. Since the quantity of read charges is proportional to the integration time, the sensitivity to R is substantially higher than the sensitivity to B. In this case, therefore, the solid image pickup device is suitable for picking up an image under illumination at a high color temperature.

If the read control pulse 40 of the R element is changed to a pulse 49 indicated by a broken line and the read control pulse 41 of the B element 2 is changed to a pulse 50 indicated by a broken line, then the integration time $t_{RL}$ of the R element 3 and the integration time $t_{BL}$ of the B element 2 have a relation of $t_{RL} < t_{BL}$. Therefore, the sensitivity to B is substantially higher than the sensitivity to R. In this case, the solid image pickup device is suitable for picking up an image under illumination at a low color temperature.

In this embodiment, the timing of applying a positive potential read control pulse is adjusted independently for each color. Therefore, the signal integration time (storage time) of each color can be controlled as desired and an optimum color signal component ratio can be set.

Pulses 42, 43, 44, 45 and 46 shown in FIG. 2 are four-phase vertical transfer pulses applied as the signals φV1, φV2R, φV2B, φV3 and φV4. The pulses 43 and 44 have the same phase. The signals φV2R and φV2B have different read control pulses 40 and 41 and the same transfer pulses 43 and 44.

The vertical transfer element 4 transfers charges in response to the four-phase pulses φV1, φV2R, φV3 and φV4 or the four-phase pulses φV1, φV2B, φV3 and φV4. A signal 47 in the signals φH1 and φH2 conceptually illustrates two-phase horizontal transfer pulses for driving the horizontal transfer unit 12. A pixel signal 48 in an output signal OUT is a voltage signal output from an output circuit 13. The fundamental vertical transfer operation is the same as the conventional techniques described with FIG. 8.

The signal φV3 contains the positive potential read pulse 39 for reading signal charges from the G element and the negative potential transfer pulses 45 for transferring signal charges on the vertical transfer element 4 in the vertical direction. The read pulse 39 and transfer pulses 45 are therefore contained in the same signal φV3. Such a signal structure is also applied to the signals φV2R and φV2B.

2nd Embodiment

Figure 3:
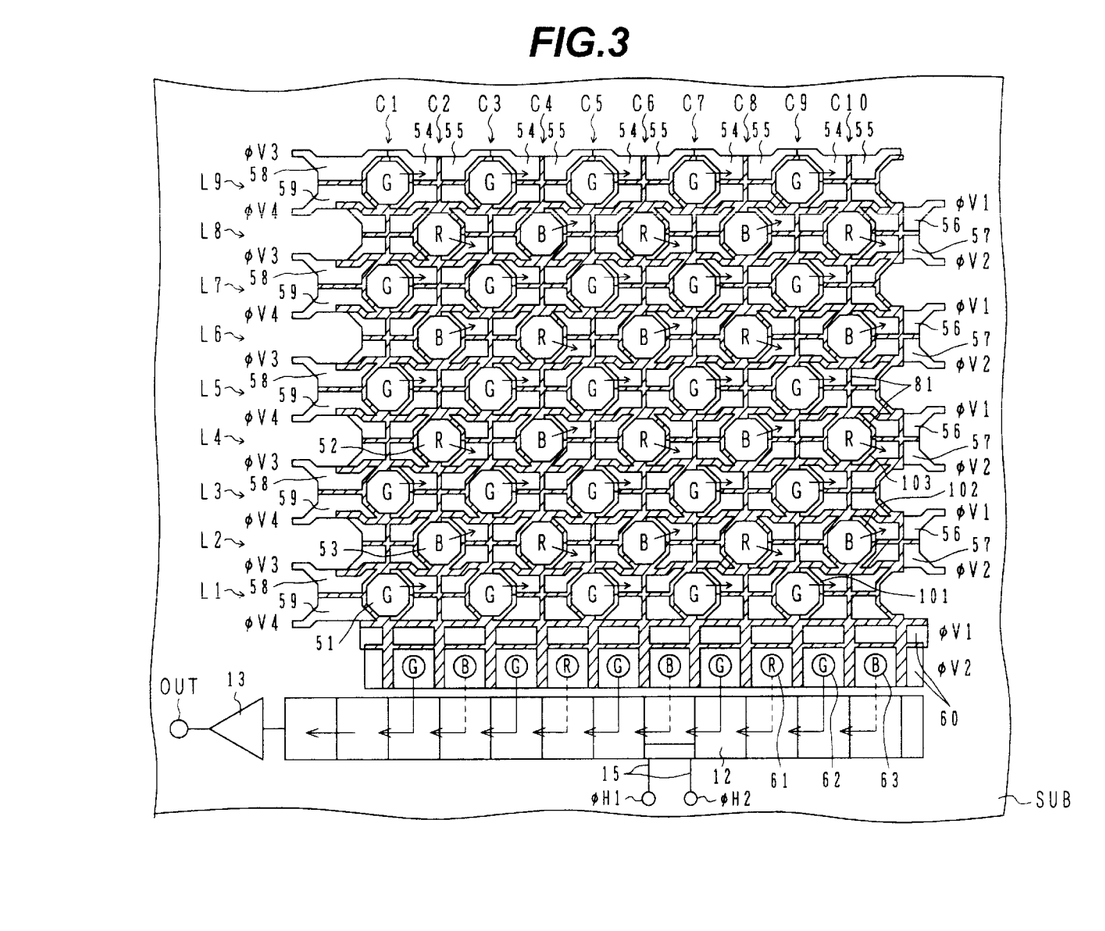
FIG. 3 is an enlarged plan view showing a portion of a solid state image pickup device according to a second embodiment of the invention.
Figure 4:
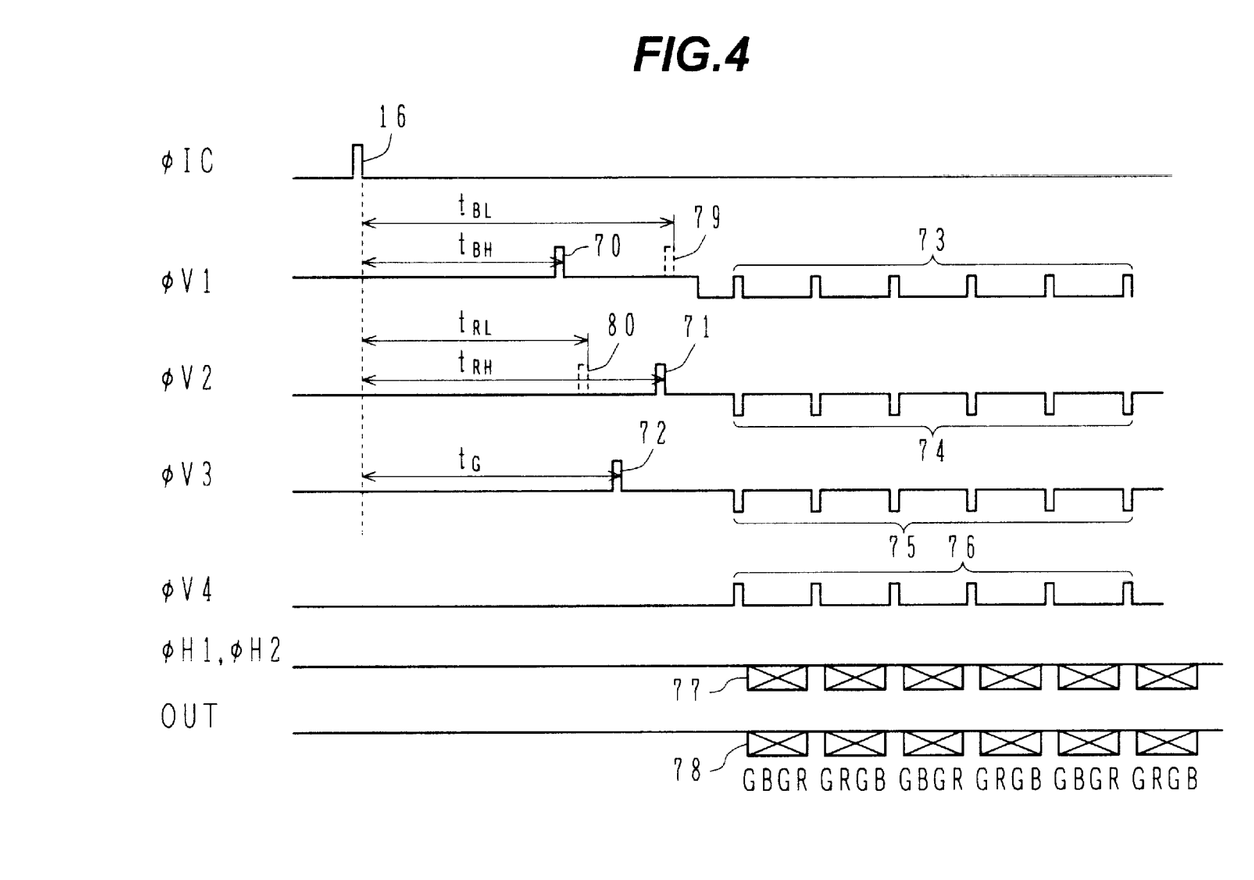
FIG. 4 is a timing chart illustrating the operation of the solid state image pickup device shown in FIG. 3.

FIG. 3 is an enlarged plan view showing a portion of a solid state image pickup device according to the second embodiment of the invention, and FIG. 4 is a timing chart illustrating the operation of the solid state image pickup device. In FIGS. 3 and 4, elements having identical reference numerals to those shown in FIGS. 8 and 9 have fundamentally the same functions as those described with FIGS. 8 and 9.

As different from the Bayer layout of the first embodiment, in the solid state image pickup device shown in FIG. 3, light reception elements of a G light reception row is displaced in the row (right/left) direction by about a half of an element pitch from light reception elements of an adjacent R/B light reception row in the column (up/down) direction. At the first row (first line) L1, only G elements 51 are disposed. At the second row (second line) L2, B elements 53 and R elements 52 are alternately disposed from the left to right, at the third row (third line) L3, only G elements 51 are disposed, and at the fourth row (fourth line) L4, R elements 52 and B elements 53 are alternately disposed from the left to right. At the following rows, the above layout is repeated. Light reception elements 51, 52 and 53 fill a half area of the two-dimensional matrix having nine rows L1 to L9 and ten columns C1 to C10.

First vertical transfer elements 54 extending in the column direction in a zigzag way between adjacent light reception columns transfer signal charges obtained from the G elements 51 to the lower area in the column direction. Charges in the G element 51 are read to the right vertical transfer element 54. The first vertical transfer element 54 has four transfer electrodes per one light reception element. The four transfer electrodes constitute one transfer stage. Coupled transfer stages of one column constitute vertical transfer elements 54 of one column. The four transfer electrodes corresponding to each light reception element are applied with four-phase transfer pulses φV1, φV2, φV3 and φV4.

Similarly, second vertical transfer elements 55 extending in the column direction in a zigzag way between adjacent light reception columns transfer signal charges obtained from the R and B elements 52 and 53 to the lower area in the column direction. Charges in the G element 52 or B element 51 are read to the right vertical transfer element 55. The second vertical transfer element 55 has four transfer electrodes per one light reception element. The four transfer electrodes constitute one transfer stage. Coupled transfer stages of one column constitute vertical transfer elements 55 of one column. The four transfer electrodes corresponding to each light reception element are applied with the four-phase transfer pulses φV1, φV2, φV3 and φV4.

The transfer electrodes of the first and second vertical transfer elements 54 and 55 for the same phase are formed electrically integrally. A transfer electrode 56 electrically connected to the vertical transfer elements 54 and 55 in the row direction is applied with the signal φV1 (vertical transfer pulse 73) shown in FIG. 4 and forms a portion of the vertical transfer elements 54 and 55. A transfer electrode 57 electrically connected to the vertical transfer elements 54 and 55 in the row direction is applied with the signal φV2 (vertical transfer pulse 74) shown in FIG. 4 and forms a portion of the vertical transfer elements 54 and 55. A transfer electrode 58 electrically connected to the vertical transfer elements 54 and 55 in the row direction is applied with the signal φV3 (vertical transfer pulse 75) shown in FIG. 4 and forms a portion of the vertical transfer elements 54 and 55. A transfer electrode 59 electrically connected to the vertical transfer elements 54 and 55 in the row direction is applied with the signal φV4 (vertical transfer pulse 76) shown in FIG. 4 and forms a portion of the vertical transfer elements 54 and 55.

Signal charges transferred in a zigzag way by the vertical transfer elements 54 and 55 to the lower area in the column direction are guided by a transfer electrode to positions at equal pitch in the row direction. In this case, the signals φV1 and φV2 are applied to the transfer electrode 60.

Reference numerals 61, 62 and 63 conceptually represent bundles of electric charges of each R, G and B element, the electric charges being stored in a semiconductor charge storage region under the transfer gate 60. A region 81 shown hatched is an element isolation layer (insulating layer) for electrically separating each photoelectric conversion element from the vertical transfer elements 54 and 55 and electrically separating each vertical transfer element 54 from each vertical transfer element 55. Regions 101, 102 and 103 without the element separation layer 81 between each photoelectric conversion element and the vertical transfer elements 54 and 55 are signal read gates. These read gates 101, 102 and 103 are electrically integrally formed with the transfer electrodes 58, 56 and 57 forming portions of the vertical transfer elements 54 and 55. The signals φV3, φV1 and φV2 are applied to the read gates 101, 102 and 103.

A B signal is read from the B element 53 by applying a positive potential read pulse 70 (FIG. 4) as the signal φV1 to the read gate 102. An R signal is read from the R element 52 by applying a positive potential read pulse 71 (FIG. 4) as the signal φV2 to the read gate 103. A G signal is read from the G element 51 by applying a positive potential read pulse 72 (FIG. 4) as the signal φV3 to the read gate 101. It is therefore possible to independently control the signal charge read timings of G, B and R.

A signal storage time (integration time) of the B element 53 is determined by a period $t_{BH}$ from the fall timing of the clear pulse 16 to the fall timing of the read pulse 70. A signal storage time (integration time) of the R element 52 is determined by a period $t_{RH}$ from the fall timing of the clear pulse 16 to the fall timing of the read pulse 71. A signal storage time (integration time) of the G element 51 is determined by a period $t_G$ from the fall timing of the clear pulse 16 to the fall timing of the read pulse 72.

With the read pulses 70, 71 and 72, the integration time is $t_{RH}>t_{BH}$. The sensitivity to R is substantially higher than the sensitivity to B. In this case, therefore, the solid image pickup device is suitable for picking up an image under illumination at a high color temperature. In contrast, if the read pulse 71 of the read control signal φV2 for the R element 52 is changed to a pulse 80 indicated by a broken line and the read pulse 70 of the read control signal φV1 for the B element 53 is changed to a pulse 79 indicated by a broken line, then the integration time $t_{RL}$ of the R element 52 and the integration time $t_{BL}$ of the B element 53 have a relation of $t_{RL}<t_{BL}$. Therefore, the sensitivity to B is substantially higher than the sensitivity to R. In this case, the solid image pickup device is suitable for picking up an image under illumination at a low color temperature.

A different point of the second embodiment from the first embodiment (FIG. 1) is that only the pulse feed lines for the four-phase vertical transfer pulses φV1, φV2, φV3 and φV4 are used without adding specific pulse feed lines.

A signal 77 in the signals φH1 and φH2 shown in FIG. 4 conceptually shows the two-phase horizontal transfer pulses for driving the horizontal transfer unit 12. A pixel signal 78 in an output signal OUT is a voltage signal output from an output circuit 13. The first pixel signal 78 is a pixel signal combining signals from the first row L1 and second row L2. The second pixel signal 78 is a pixel signal combining signals from the third row L3 and fourth row L4.

3rd Embodiment

Figure 5:
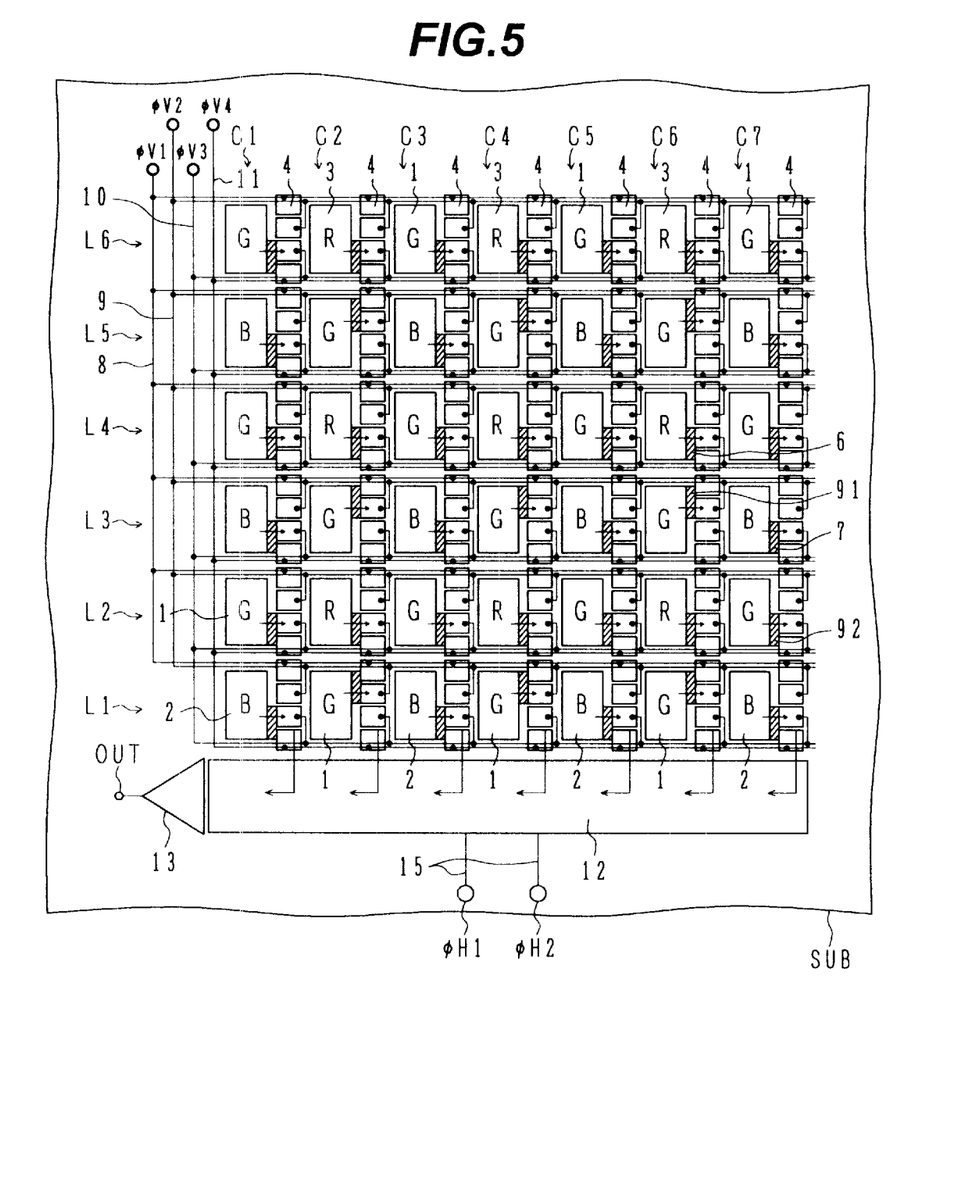
FIG. 5 is an enlarged plan view showing a portion of a solid state image pickup device according to a third embodiment of the invention.
Figure 6:
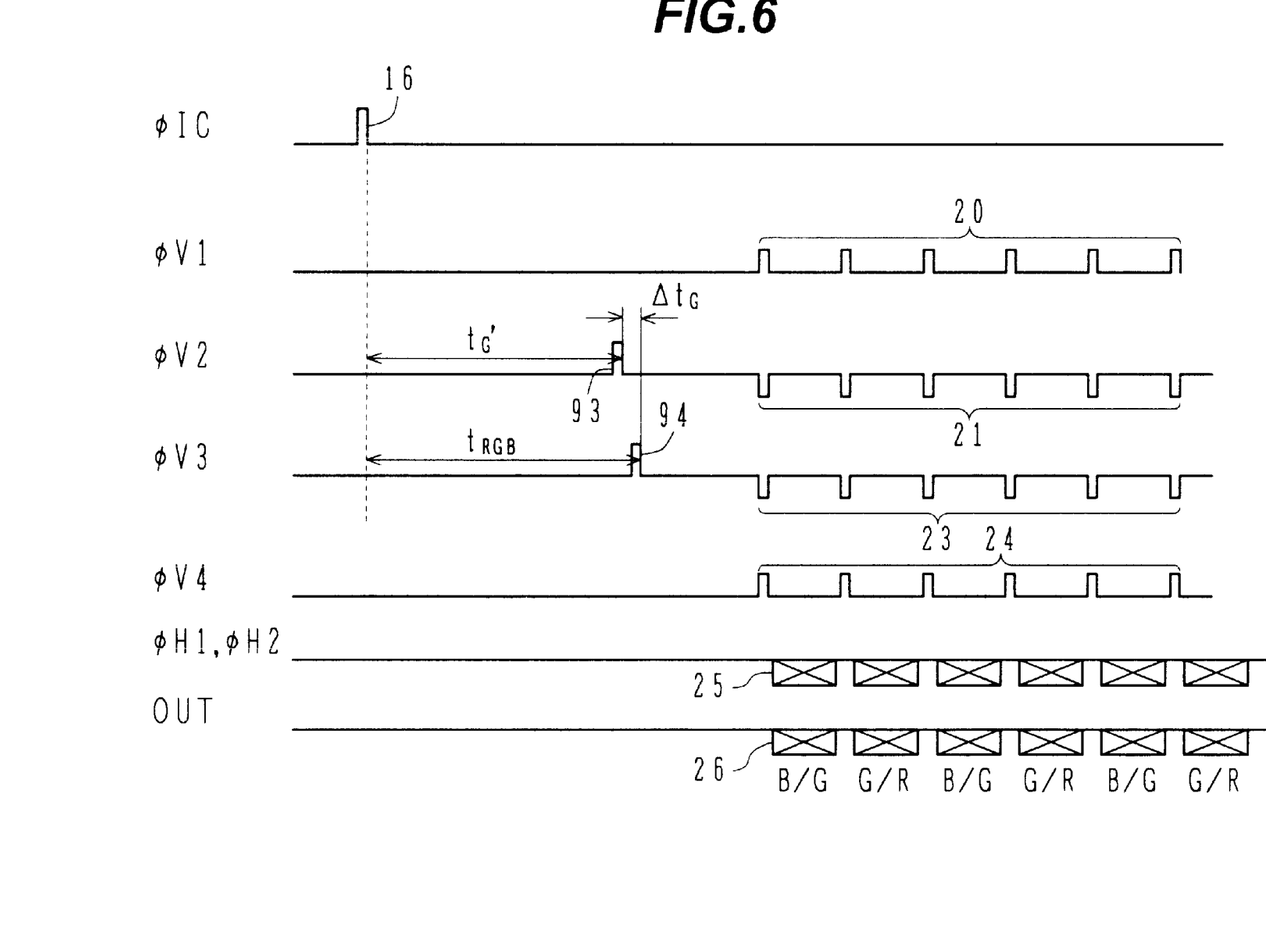
FIG. 6 is a timing chart illustrating the operation of the solid state image pickup device shown in FIG. 5.

FIG. 5 is an enlarged plan view showing a portion of a solid state image pickup device according to the third embodiment of the invention, and FIG. 6 is a timing chart illustrating the operation of the solid state image pickup device. In FIGS. 5 and 6, elements having identical reference numerals to those shown in FIGS. 8 and 9 have fundamentally the same functions as those described with FIGS. 8 and 9.

The solid state image pickup device shown in FIG. 5 has the same layout (so-called Bayer layout) as that of the color filter of the first embodiment (FIG. 1). This solid state image pickup device has an overflow drain structure which uses a semiconductor substrate SUB as a drain. The layout of color filters is also same as that of the first embodiment.

Different structures from the structures shown in FIGS. 1 and 8 will be described. A signal read gate 91 shown hatched is used for reading a signal from the G element 1 at the odd row (L1, L3, L5) and is formed in an upper area of the G element 1. A signal read gate 92 shown hatched is used for reading a signal from the G element 1 at the even row (L2, L4, L6) and is formed in a lower area of the G element 1. The read gate 91 is controlled by a pulse 93 (FIG. 6) in the signal φV2, and the read gate 92 is controlled by a pulse 94 (FIG. 6) in the signal φV3. In addition to the read gate 92, the read pulse 94 also controls both the read gate 6 of the R element 3 and the read gate 7 of the B element 2.

An integration time of the B element 2, R element 3, and G element at the even row is determined by a period $t_{RGB}$ from the falling timing of the clear pulse 16 to the falling timing of the read pulse 94. The integration time of the G element at the odd row is determined by a period $t_G$ from the falling timing of the clear pulse 16 to the falling timing of the read pulse 93.

The characteristic feature of the third embodiment is that the signal integration time of the G element at the even row (L2, L4, L6) sandwitched between the upper and lower B elements and the signal integration time of the G element at the odd row (L1, L3, L5) sandwitched between the upper and lower R elements can be controlled independently. Namely, the relative effective sensitivities of the G elements at the even and odd rows can be independently controlled as desired. This provides the following advantages.

In the layout of photoelectric conversion elements of a lattice or matrix shape, a crosstalk occurs between adjacent light reception elements because the light reception elements are nearer to each other in the vertical direction. The influence of crosstalk becomes conspicuous as light reception elements are highly integrated and made finer. A most severe issue is that the crosstalk amount from the B element to the G element is different from the crosstalk amount from the R element to the G element. Therefore, even if the same G signal is picked up, the output level at the even row becomes different from that at the odd row so that a fixed lateral stripe pattern is formed on a reproduced image as noises.

In the solid state image pickup device of the third embodiment, the sensitivities of the G elements at the odd and even rows are made different by adjusting the signal integration times. Therefore, the adverse effect to be caused by different crosstalk amounts of the R and B elements can be compensated for.

More specifically, the integration time $t_G'$ of the G element at the odd row to be determined by the falling timing of the read pulse 93 in the signal $\phi V2$ is adjusted so that a difference $\Delta t_G$ between the integration time $t_G'$ and the integration time $t_{RGB}$ of the G element at the even row to be determined by the falling timing of the read pulse 94 in the signal $\phi V3$ corresponds to a difference between crosstalk amounts. In this manner, even if there is a difference between crosstalk amounts, the output levels of the G signals at the even and odd rows can be made substantially equal so that the fixed lateral stripe pattern noises can be reduced from a reproduced image.

Figure 7:
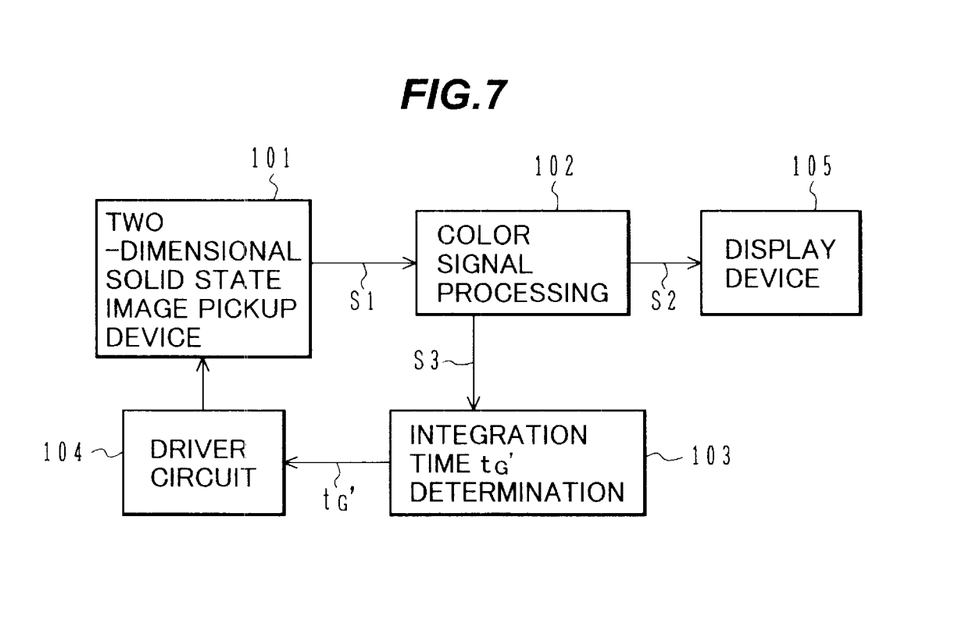
FIG. 7 is a block diagram of a circuit for detecting a difference in the amounts of crosstalk and determining an integration time according to the third embodiment.

FIG. 7 shows an example of a system configuration which determines the integration time $t_G'$ by detecting a difference in the crosstalk amount between R and B elements relative to the G element in accordance with RGB signals.

A two-dimensional solid state image pickup device 101 is a device same as the device shown in FIG. 5 and outputs a signal S1 to a color signal processing circuit 102. The color signal processing circuit 102 executes a color signal processing such as color temperature adjustment (white balance) for the signal S1, and outputs a video signal S2 to a display device 105 and outputs RGB signals S3 to an integration time determining circuit 103.

The integration time determining circuit 103 compares the signal levels of the G elements at the even and odd rows in accordance with the RGB signals S3. The G element at the odd row receives crosstalk from the adjacent R element in the vertical direction. The G element at the even row receives crosstalk from the adjacent B element in the vertical direction. If the signal level of the G element at the odd row is larger than that at the even row, the integration time $t_G'$ is shortened to thereby lower the sensitivity of the G element at the odd row. Conversely, if the signal level of the G element at the odd row is smaller than that at the even row, the integration time $t_G'$ is made longer to thereby raise the sensitivity of the G element at the odd row. By adjusting the integration time $t_G'$, the output levels of the G elements at the even and odd rows can be made equal even if the crosstalk amounts of the G elements at the even and odd rows are different.

The integration time determining circuit 103 supplies the integration time $t_G'$ to a driver circuit 104. The driver circuit 104 generates the signal $\phi V2$ corresponding to the adjusted integration time $T_G'$ and also generates the signals $\phi IC$, $\phi V1$, $\phi V3$, $\phi V4$, $\phi H1$ and $\phi H2$ shown in FIG. 6.

In accordance with these signals generated by the driver circuit 104, the solid state image pickup device 101 is controlled. The G element at the odd row accumulates charges only during the integration time $t_G'$. The G element at the even row accumulates charges only during the integration time $t_{RGB}$. Since the new integration time $t_G'$ is fed back, the signal levels of the G elements at the even and odd rows are made equal.

The output signal S1 of the solid state image pickup device 101 is supplied via the color processing circuit 102 to the display device 105 as described above, and the display device 105 displays an image with less fixed lateral stripe pattern noises.

The present invention has been described in connection with the preferred embodiments. The invention is not limited only to the above embodiments. It is apparent that various modifications, improvements, combinations, and the like can be made by those skilled in the art.

What is claimed is:

1. A solid state image pickup device comprising:

a plurality of photoelectric conversion elements formed on a two-dimensional plane for generating and accumulating electric charges corresponding to an amount of incidence light;

color filters of a plurality of colors disposed on the plurality of photoelectric conversion elements;

control signal generating means for independently setting for each color a charge storage time of the plurality of photoelectric conversion elements formed with color filters and generating for each color a read control signal of the plurality of photoelectric conversion elements after a lapse of each charge storage time;

reading means for reading electric charges from the plurality of photoelectric conversion elements for each color in response to each read control signal for each color;

transfer means for transferring electric charges read by said reading means; and output means for outputting electric charges transferred by said transfer means to an output circuit.

2. A solid state image pickup device according to claim 1, wherein said transfer means has a plurality of transfer electrodes corresponding to each photoelectric conversion element, and said reading means includes a read electrode integrally formed with said transfer electrode, the device further comprising a signal line for each color for supplying the read control signal for each color to the read electrode for each color.

3. A solid state image pickup device according to claim 1, further comprising transfer signal supplying means for supplying the transfer signal via the signal lines to the plurality of transfer electrodes, wherein a relative position of the read electrode to the photoelectric conversion element is different between photoelectric conversion elements of at least two colors.

4. A solid state image pickup device according to claim 1, wherein the plurality of color filters include red, green and blur color filters of three colors, the plurality of photoelectric conversion elements include a first photoelectric conversion element group formed with red color filters, a second photoelectric conversion element group formed with green color filters, and a third photoelectric conversion element group formed with blue color filters, and said control signal generating means independently sets the charge storage times for the first to is third photoelectric conversion element groups and generates the read control signal for each color.

5. A solid state image pickup device according to claim 1, wherein said control signal generating means sets the storage time for the first photoelectric conversion element group longer than the storage time for the third photoelectric conversion group as compared with a case of a second illumination color temperature lower than a first illumination color temperature which is a color temperature of a subject whose image is to be picked up, and generates the read control signal for each color after a lapse of the storage time.

6. A solid state image pickup device according to claim 1, further comprising clearing means for clearing electric charges accumulated in all photoelectric conversion elements for all the colors and thereafter starting charge accumulation by all photoelectric conversion elements for all the colors.

7. A solid state image pickup device according to claim 3, wherein the photoelectric conversion elements and the color filters are disposed in a two-dimensional matrix shape, green and blue color filters are alternately disposed at some rows, and green and red color filters are alternately disposed at other roes.

8. A solid state image pickup device according to claim 7, wherein green and blue color filters are disposed alternately at some columns and green and red filters are alternately disposed at other columns.

9. A solid state image pickup device according to claim 3, wherein the photoelectric conversion elements and the color filters are disposed in a two-dimensional matrix shape, and each row includes color filters of a plurality of colors.

10. A solid state image pickup device according to claim 8, wherein said transfer signal supplying means supplies a four-phase transfer signal.

11. A solid state image pickup device according to claim 10, wherein the signal line includes five signal lines.

12. A solid state image pickup device according to claim 11, wherein a signal line corresponding to a red photoelectric conversion element and a signal line corresponding to a blue photoelectric conversion element supply different read control signals and same transfer signals.

13. A solid state image pickup device according to claim 12, wherein said transfer means includes four transfer electrodes for each photoelectric conversion element.

14. A solid state image pickup device according to claim 3, wherein the photoelectric conversion elements are disposed in a two-dimensional matrix shape, and a photoelectric conversion element row and an adjacent photoelectric conversion element row is deviated by a half pitch of photoelectric conversion elements in a row direction.

15. A solid state image pickup device according to claim 14, wherein said transfer means extends in a zigzag way between adjacent photoelectric elements in a column direction.

16. A solid state image pickup device according to claim 15, wherein only green color filters are disposed at some rows, and blue and red color filters are alternately disposed at other rows.

17. A solid state image pickup device according to claim 16, wherein said transfer signal supplying means supplies a four-phase transfer signal.

18. A solid state image pickup device according to claim 17, wherein the signal line includes four signal lines.

19. A solid state image pickup device according to claim 18, wherein said transfer means includes four transfer electrodes for each photoelectric conversion element.

* * * * *